ular to a film pusher station. In the insertion mode, after a section of film of a desired length is extended from the trackway for insertion in a given channel through its entry slot, an automatic three-phase insertion cycle is initiated. In the first phase, the section is cut to produce a film chip whose tail projects beyond the entry slot. In the second phase, the platform is indexed one forward step to align the next empty channel with the trackway and the tail of the chip with the film pusher. In the third phase, the film pusher acts to engage the tail and push it into the channel, thereby loading the chip in the channel. Operation in the structuring mode, which involves an automatic four-phase cycle, is reserved for chips whose length is shorter than the channel length, this operation serving to push the chip within the channel to a point where its leading edge coincides with the front end of the channel. The first three phases of the structuring mode are the same as in the insertion mode, this being followed by a fourth and final phase in which the platform is reverse-indexed to bring the loaded channel back into line with the trackway, making it possible for the operator to advance the film web into the channel to engage and push the chip therein to the desired point.

United States Patent [19]

Dorman

[11] 4,167,842
[45] Sep. 18, 1979

[54] READER-FILLER MACHINE FOR MICROFILM JACKETS OPERABLE IN INSERTION OR STRUCTURING MODE

[75] Inventor: Isidore Dorman, Whitestone, N.Y.

[73] Assignee: NB Jackets Company (Division of Bell & Howell Company), Chicago, Ill.

[21] Appl. No.: 893,782

[22] Filed: Apr. 5, 1978

[51] Int. Cl.² .............................................. B65B 61/06
[52] U.S. Cl. ................................................. 53/520
[58] Field of Search ......................................... 53/520

[56] References Cited

U.S. PATENT DOCUMENTS

3,457,697  7/1969  Engelstein ............................. 53/520

Primary Examiner—Travis S. McGehee
Attorney, Agent, or Firm—Michael Ebert

[57] ABSTRACT

A reader-filler machine adapted to cut and insert sections of microfilm into the channels of a multi-channel microfiche jacket, each channel having an entry slot adjacent its rear end. The jacket to be loaded is placed on a platform that is shiftable stepwise with respect to a film trackway guiding a film web, the trackway being

4 Claims, 12 Drawing Figures

READER-FILLER MACHINE FOR MICROFILM JACKETS OPERABLE IN INSERTION OR STRUCTURING MODE

BACKGROUND OF INVENTION

This invention relates generally to reader-filler machines for loading a multi-channel microfiche jacket with microfilm chips, and more particularly to a machine of this type which is capable of bringing into registration the leading edges of all chips within the several channels of the jacket regardless of the length of the chips to thereby structure the jacket for purposes of referencing.

U.S. Pat. No. 3,238,655, entitled "Microfiche Master," discloses a microfiche master composed of a transparent jacket formed by two clear plastic panels laminated together by ribs which are spaced to define a series of chambers or channels adapted to accommodate microfilm frames. The loaded, multi-channel jacket functions as a microfiche master from which reference copies may be made. This is effected by contact-printing through the front panel which is quite thin, the back panel being thicker to impart body to the jacket. Such microfiche masters are highly useful in storing and disseminating information.

In U.S. Pat. Nos. 2,937,483 and 3,238,655, a film-feeding machine is disclosed which functions to slice microfilm and to insert the cut pieces or chips into the channels of the microfiche jacket. By the use of this machine insertions are made by placing the microfiche jacket on an inclined platform carriage which is shiftable to register successive jacket chambers with the leading edge of the incoming film web, the film being guided along a trackway terminating adjacent the edge of the platform. In operation, a film section constituted by one or more microfilm frames is advanced into a selected chamber and trailing edge of the section is severed to form a film clip. The platform is then indexed to the next chamber position for a new insertion.

To facilitate insertion, the microfiche jacket is provided with entry slots adjacent the rear ends of the chambers, thereby making it possible to insert the film laterally at an angle to the plane of the jacket rather than in an endwise direction which entails exact co-planar alignment of the film with the jacket. Since a flexible film has a tendency to curl, the advantage of angular insertion is that the angle of insertion is not critical; for the film entering the slot then bends inwardly into the chamber and is admitted without difficulty. To facilitate angular insertion, the platform on which the jacket is supported is inclined relative to the film trackway.

The film is sliced at a point directly adjacent the edge of the jacket. Since the slot through which the film enters the chamber is displaced from this edge, the cut section is not fully inserted and a short tail thereof remains exposed. If a subsequent insertion is to be made in the same chamber, the tail is objectionable, for it prevents a new insertion. Thus it becomes necessary to employ a pusher element to clear the slot and thereby complete the insertion.

In loading a multi-channel microfiche jacket with microfilm chips cut from a film reel, some of the chips will be longer than others. The largest acceptable chip is one that fully occupies the chamber or channel, but depending on the information to be stored, some chips may be shorter. If, for example, the largest acceptable chip has ten image frames, some may have eight or nine, and others only two or three.

It is sometimes essential or desirable that all chips loaded into the several channels have their right or leading edge in line with the right end of the channel regardless of the length of the chips, so that all leading edges of the chips are in registration with each other. The reason for so "structuring" a microfiche jacket is to facilitate referencing in the X and Y coordinates, whereby all leading edges of the chips terminate in a common Y axis.

Such structuring can be accomplished when using a reader-filler machine of the type covered by the Dorman U.S. Pat. No. 3,872,645, whose entire disclosure is incorporated herein by reference. In the machine disclosed in the Dorman patent, the jacket to be loaded is supported on a platform that is shiftable stepwise in a path at right angles with respect to a film trackway, each channel having an entry slot adjacent the leading edge of the jacket. In parallel with the trackway is a retractable film pusher whereby when the trackway is aligned with a selected channel, the pusher is then in registration with the next adjacent channel. Interposed between the platform and the trackway is a film slicer.

After an operator draws from a film reel a predetermined section of film which he advances along the trackway into the channel aligned therewith through its entry slot, a switch is actuated to initiate an automatic three-phase cycle. In the course of this cycle, first the slicer operates to cut the film whereby the tail of the severed section or chip extends outside the slot; then the platform is indexed to shift the loaded chamber into alignment with the pusher while placing the next empty chamber in line with the trackway in readiness for the next insertion; and finally the film pusher acts to engage the tail, pushing it into the slot to thereby complete the loading operation.

If the inserted chip so pushed into the chamber is shorter than the length thereof, then the trailing edge of the chip is in line with the left or rear end of the channel. But to effect structuring, it is necessary that the leading edge of the chip be lined up with the right or front end of the channel.

In order to accomplish structuring with the Dorman machine, the chamber loaded with the chip has first to be manually indexed in the reverse direction to bring it back into alignment with the film trackway. Then the film in the trackway is advanced by the operator to function as a pushing tool to engage the trailing edge of the chip and to push it until its leading edge is positioned adjacent the leading end of the channel. Then the film is retracted. This manual structuring procedure is relatively complicated and time-consuming.

SUMMARY OF INVENTION

In view of the foregoing, the main object of this invention is to provide a reader-filler machine selectively capable of operating either in an insertion mode for loading chips of varying length into the channels of a multi-channel jacket with the trailing edges of the chips contiguous with the entry slots of the channels, or in a structural mode for loading these chips into the channels with their leading edges contiguous with the front ends of the channels.

More particularly, it is an object of this invention to provide a machine going through an automatic three-phase cycle in the insertion mode wherein the jacket supported on a platform is indexed one step forward beyond the film trackway-the chip at the end of this cycle lying within a given channel with its trailing edge contiguous with the entry slot thereto, the machine going through an automatic four-phase cycle in the structuring mode, the first three phases of which being the same as in the insertion mode, the platform being reverse-indexed in the fourth phase to bring the loaded channel back into line with the trackway whereby the film therein may then be used to push the chip in the channel so that its leading edge is contiguous with the front end of the channel.

Briefly stated, these objects are attained in a reader-filler machine having a platform that is shiftable stepwise in a linear motion path normal to a stationary film trackway whereby the channels in a multi-channel microfiche jacket placed on the platform are sequentially brought into registration with the trackway. Also provided is a pusher station at a position parallel to the trackway, the station having a retractable pusher element in registration with the channel directly next to the trackway channel.

Indexing of the platform is effected by a cylindrical cam and mode transfer feedshaft assembly. The feedshaft is suspended below the platform with its axis parallel to the motion path. The feedshaft is constituted by a series of equi-spaced short teeth projecting from one side of the shaft axis to define a row of low gaps and a series of correspondingly-positioned tall teeth projecting from the opposite side of the axis to define a row of high gaps.

The feedshaft is manually reversible about its axis to render either the row of low gaps or the row of high gaps operative with respect to the motor-driven cam which is rotatable on a spindle whose axis is parallel to the shaft axis. The cam is provided at diametrically-opposed positions with two reversely-pitched helical segments adapted to intermesh with the feedshaft teeth, one segment being short and the other tall.

When the row of the low gaps is operative and the cam makes a full revolution to cause the two segments in sequence to pass by the feedshaft, only the tall segment is received within the low gap in line therewith to intermesh with the short teeth which define this gap; for the short segment falls short of the low gap. As a consequence, the shaft and the platform associated therewith is indexed one forward step by a distance determined by the axial displacement between the leading and trailing edge of the tall helical segment. At the end of this step, the next low gap on the feedshaft is in alignment with the leading edge of the tall segment whereby the next full cam revolution causes the platform to index another forward step.

When, however, the row of high gaps is operative and the cam is caused to make a full revolution to cause the tall and short segments to pass the feedshaft in sequence, first the tall segment is received in the high gap in line therewith to index the platform one forward step and then the short segment is received in the high gap to reverse-index the platform one back step so that at the end of the revolution the platform is back where it started.

Operation in the insertion mode is effected by turning the mode transfer feedshaft to present to the cam the row of low gaps; for then in the first phase of the automatic three-phase cycle a film section inserted in a given jacket channel is cut, and in the second phase, the cam is driven to make a full revolution to index the platform one forward step to align the tail of the inserted film section with a pusher station, the next empty channel then being in registration with the film trackway. In the third phase in the insertion mode, the pusher element is actuated to push the tail into the entry slot so that the trailing edge of the chip is then contiguous with this slot.

Operation in the structuring mode is effected by turning the mode-transfer feedshaft to present the cam to the row of high gaps; for then a four-phase cycle takes place, the first three phases being the same as in the insertion mode followed by a fourth and final phase in which the platform is reverse indexed one back step to permit the operator to advance the film in the trackway to push the chip through the channel to a point where its leading edge is contiguous with the front end of the channel.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

Structured and Unstructured Microfiche Master

Figures 1, 2, 3, 4:
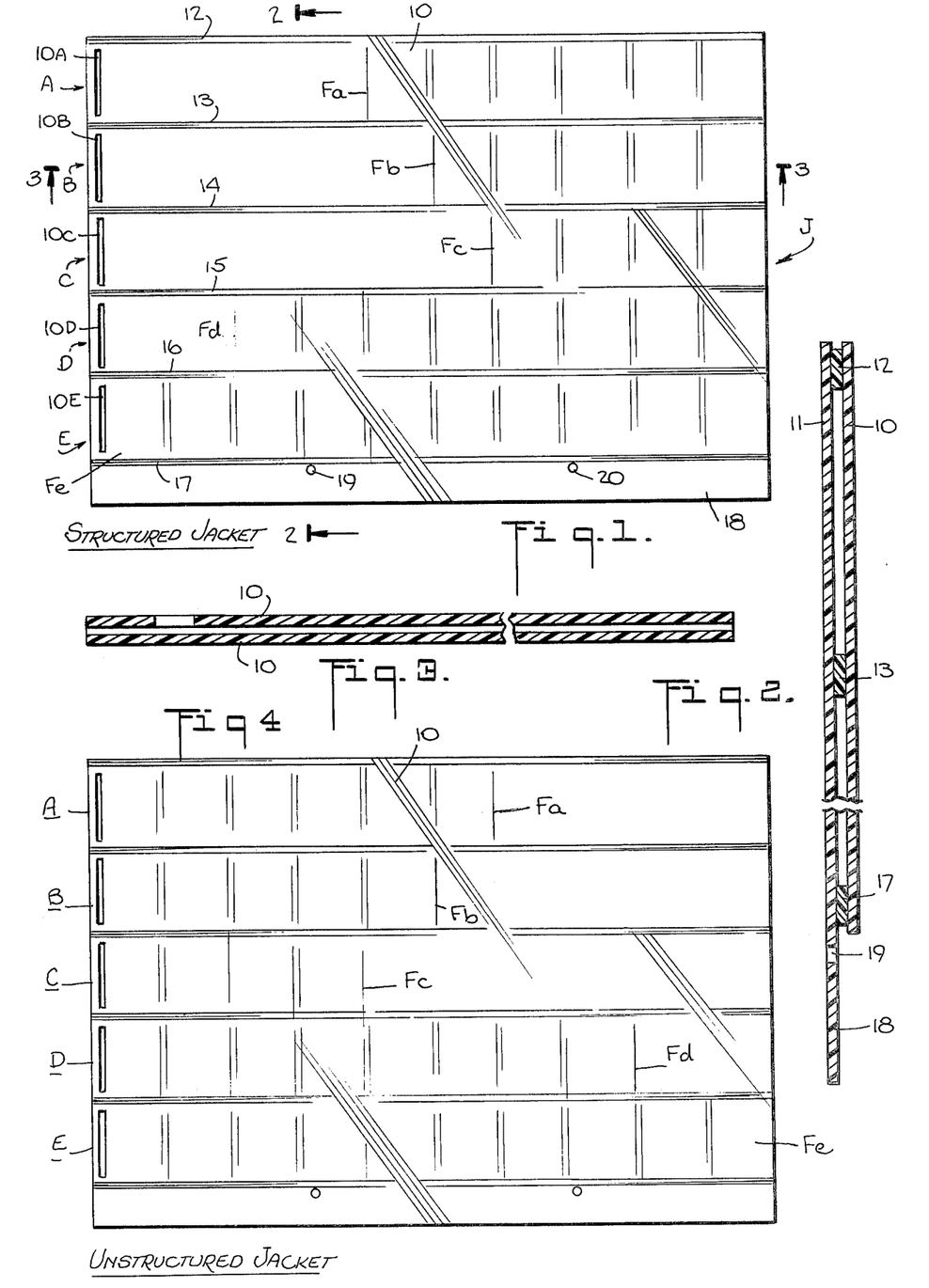
FIG. 1 is a plan view of a microfiche master loaded with structured microfilm chips resulting from operation of a machine in accordance with the invention in the structuring mode.
FIG. 2 is a transverse section taken in the plane indicated by line 2—2 in FIG. 1.
FIG. 3 is a longitudinal section taken in the plane indicated by line 3—3 in FIG. 1.
FIG. 4 is a plan view of a microfiche master loaded with unstructured microfilm chips resulting from operation of the machine in the insertion mode.

Referring now to FIGS. 1, 2 and 3, a microfiche master is shown, the master being constituted by a transparent multiple-chamber jacket J having parallel channels or chambers A, B, C, D and E.

Jacket J is constituted by two transparent rectangular panels 10 and 11 in superposed relation, the panels being formed of clear, flexible plastic material, such as cellulose acetate, Mylar, or any other suitable sheeting having high tensile strength. Interposed between the top and back panels and adhesively secured thereto are parallel ribs of plastic or paper formed by longitudinally-extending narrow ribbons 12, 13, 14, 15, 16 and 17 to define chambers A to E which are open at either end. The chambers are of like width to accommodate microfilm of a given size, such as 16 mm film.

Back panel 10 is somewhat wider than top panel 11, to provide a marginal extension which is coated with translucent coating 18 for titling the microfiche master.

This title will be reproduced in contact-printing, because of the translucency of the coating.

To facilitate insertion of microfilm, rectangular slots 10A to 10E are cut across back panel 10 adjacent the front end of the chamber openings. Top panel 11 is of thin, clear plastic material (i.e., about 1 mil or less) to facilitate contact-printing, whereas back panel 10 is preferably of heavier gauge transparent material (i.e., 3 to 5 mils) to give body to the microfiche. The ribs are of substantially the same thickness as the inserted microfilm sections, or slightly thinner, so that no space exists between the top panel and the microfilm insert and the sensitive film is virtually in contact with the microfilm when contact-printing takes place. Where the microfilm to be inserted is relatively thin (i.e., 3 mils or less), the ribs are correspondingly thin.

Also provided are two pin-locating holes 19 and 20 which are punched at longitudinally spaced positions between the titling strip 18 and the last rib 17. It is important, when inserting microfilm strips, that the jacket on the platform of the film-feeding machine be precisely in parallel relationship with the film path. A slight displacement of the jacket from its proper parallel position makes insertion difficult, for then the strip tends to travel toward one side of the channel rather than through the channel, and jamming occurs. By the use of guide pins on the platform of the film-feeding machine adapted to receive the locating holes 19 and 20, proper registration of the jacket is insured.

In loading a multi-channel microfiche jacket master J of the type shown with microfilm sections or chips from a film reel, some chips will be longer than others. The largest acceptable chip is one that fully occupies the chamber or channel, but, depending on the information to be stored, some chips may be shorter. We shall assume, in connection with FIG. 1, that the largest acceptable film chip is one having ten frames; hence a ten-frame chip will fill the entire channel, whereas chips with a lesser number of frames will occupy only a portion of the channel.

As explained previously, in many practical applications, it is essential that all chips loaded into the several channels have their right or leading edge coincide with the right end of the channels in jacket J regardless of chip length. In this state, the chips are "structured," thereby facilitating referencing of the frames in the X and Y coordinates, for all leading edges of the chips then terminate in a common Y axis.

FIG. 1 illustrates a "structured" jacket in which film chip $F_a$ in channel A has six frames, chip $F_b$ in channel B has five frames, chip $F_c$ in channel C has four frames, chip $F_d$ in channel D has eight frames, and chip $F_e$ in channel E has ten frames. Only chip $F_e$ fully occupies its channel, all other chips falling short. However, the leading edges of all chips are in line with the right end of jacket J; hence the jacket is properly structured.

A machine in accordance with the invention is selectively operable in an indexing mode in which the microfiche master is loaded with chips whose trailing edges are in line with the entry slots at the left end of jacket J, as shown in FIG. 4, or in a structuring mode in which the leading edges of the chips are in line with the right end of jacket J, as shown in FIG. 1. Thus the operator of the machine is able to choose either mode of operation to provide a microfiche master of the desired type.

READER FILLER MACHINE

Figure 5A:
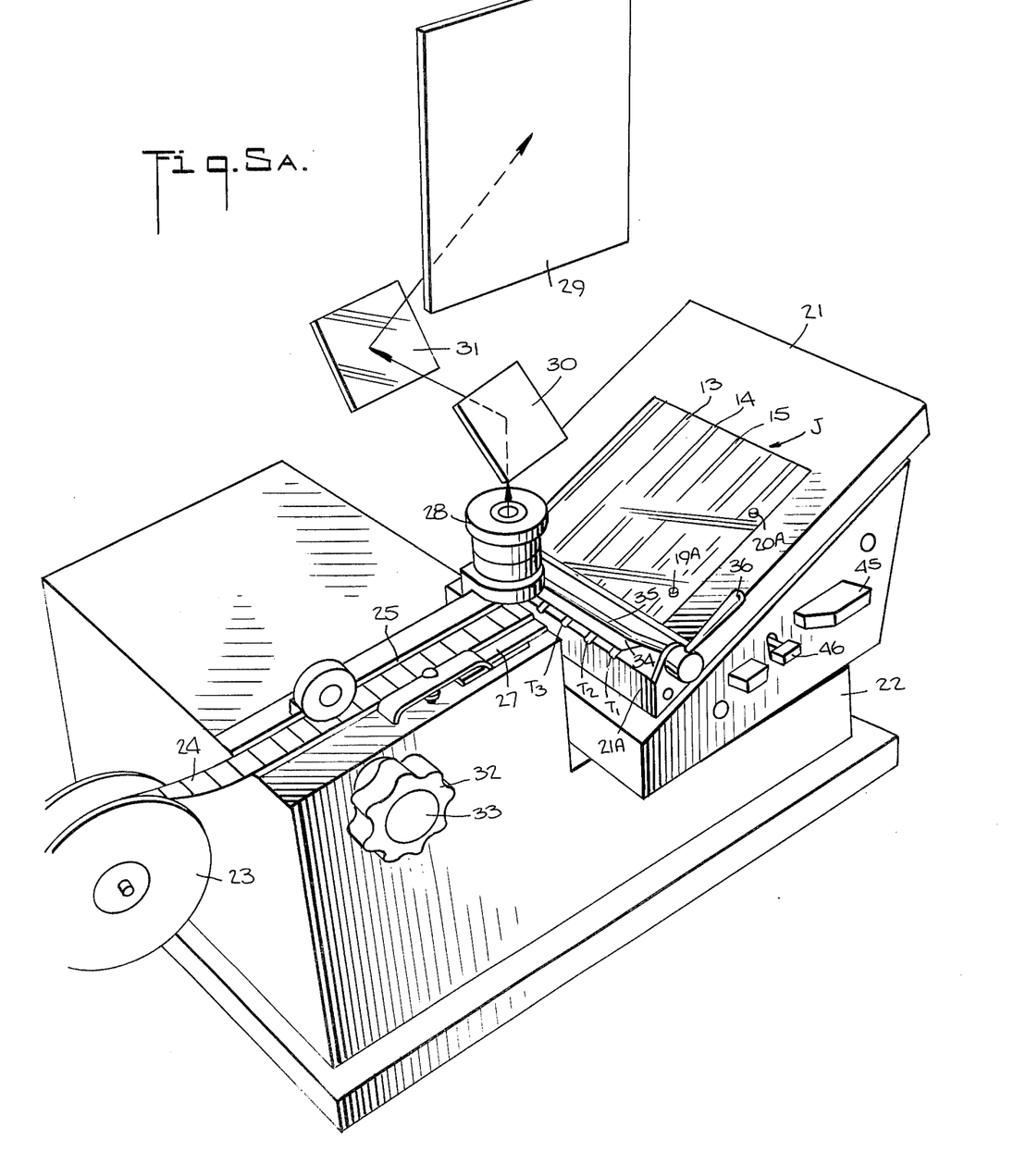
FIG. 5A is a perspective view of the reader-filler machine in accordance with the invention which is selectively operable in either the insertion or the structuring mode.
Figure 5B:
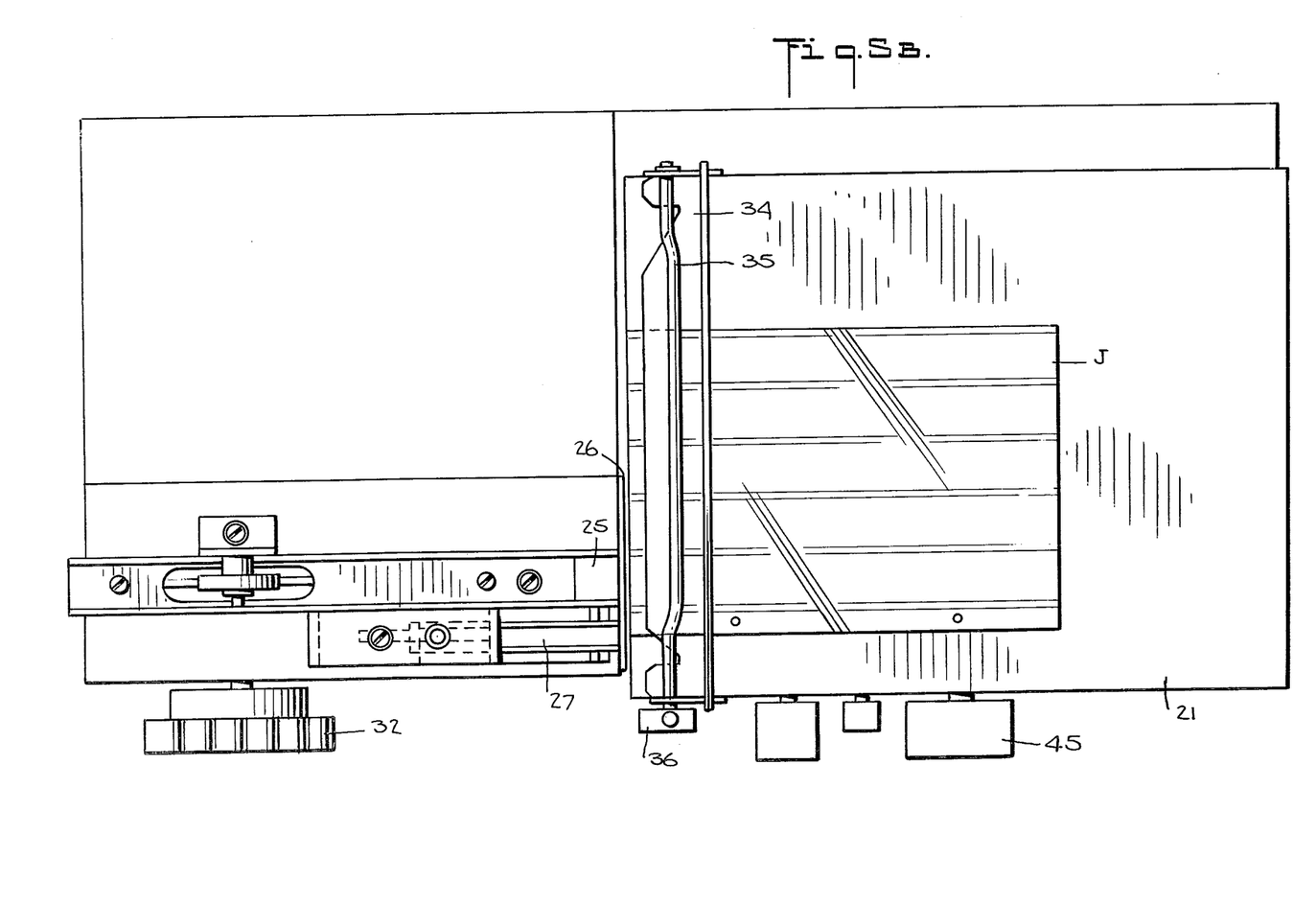
FIG. 5B is a plan view of the machine.

Referring now to FIGS. 5A and 5B, there is shown an embodiment of a reader-filler machine in accordance with the invention. Microfiche jacket J to be filled is placed at a loading station on the inclined platform 21 which is movable in a stepwise manner along a stationary bed 22. A microfilm roll is carried on a spindle-borne reel 23, and drawn therefrom is a continuous film web 24 which is fed along the trackway 25 of a film-advancing mechanism manually operated by a knob 32, the trackway terminating at a film slitter 26.

Adjacent slitter 26 in parallel relation to the trackway is a film pusher assembly, generally designated by numeral 27. The film to be inserted is viewable through an optical system 28 which projects an image on the rear view screen 29 via reflecting mirrors 30 and 31.

In operation, a jacket J to be filled is placed on the platform of carriage 21 and a channel therein is aligned with the film trackway. Guide holes 19 and 20 on the jacket are placed over guide pins 19A and 19B on the platform to ensure proper positioning of the jacket. The operator, who views the microfilm images adjacent film slicer 26, turns knob 32 of the film-advancing mechanism to insert into the operative channel as many micro-image frames as desired. The operator is able to see on viewing screen 29 the position between the last inserted frame and the succeeding frame, and thereby to line up the film slicer knife midway therebetween.

The operator then presses a switch button 33, which is conveniently located within knob 32, to initiate in the insertion mode an automatic three-phase operating cycle, where, in the first phase, the film is sliced; in the second phase, the platform is indexed to align the channel having the incompletely inserted film with the film pusher element and to align the next channel with the trackway; and in the third phase, the film pusher is actuated to complete the insertion.

It will be seen in FIG. 5A that the leading edge 21A of the inclined platform on carriage 21 is bevelled or relieved to permit the front end of jacket J to be deflected downward from the platform. Extending across the platform adjacent the leading edge thereof is a clamp assembly constituted by an upwardly-biased clamp bar 34 operated by a lever rod 35 having a handle 36 attached to one end thereof.

Secured to the underside of clamp bar 34 is a row of equi-spaced teeth $T_1$, $T_2$, $T_3$, etc., which lie in registration with ribs 12 to 17 in the jacket placed in the platform. When the jacket clamp is operative, the teeth engage correspondingly-positioned ribs on the jacket so that the jacket position in the course of loading is firmly maintained.

When handle 36 is turned to rotate lever rod 35 to raise clamp bar 34, the clamping teeth are disengaged from the ribs on the jacket, but when handle 36 is turned to lower the clamp into engagement with the jacket ribs, then the teeth force the front end of jacket J against the bevelled leading edge 21A of the platform. When this happens, the entry slots of the jacket, such as slot 10A, are bent against the junction of the bevelled edge of the platform and the flat surface thereof. This more effectively presents the slots to the advancing film on the trackway. By bending the entry slot, the slot is better exposed to advancing film which passes directly into the associated jacket chamber.

The nose of film pusher 27 is provided with a projecting ledge or film catcher, the film pusher being slidable within a guide bed. The film pusher is advanced or retracted by means of a drive pin whose upper end is received in a bore adjacent the rear of this element.

We shall now consider the sequence of operations which take place after a section of film has been inserted in a given chamber of jacket J lying on inclined platform 21. The front end of the jacket is deflected below the edge of platform 21 by means of a clamp 34. The film has been inserted in a given chamber through its entry slot, such as slot 10D which, because of the clamping action, is now bent to facilitate insertion and subsequent pushing. After the inserted film section is severed from the film on the trackway, a short tail extends beyond the entry slot. And since the front end of the jacket is deflected downwardly, the tail is free and clear of the front end of the jacket, thereby facilitating the subsequent pushing action.

When film pusher 27 begins to advance, the end of the film tail is received on the projecting catcher which, because of its ledge formation, prevents the tail from falling below the pusher. Since the film is very thin and relatively limp, in the absence of the catcher the tail could drop out of engagement with the pusher element, so that it would then fall over and obstruct the entry slot. In this event, it would not thereafter be possible to make a second film insertion. But with the catcher, this possibility is avoided.

As the pusher element advances, it moves from a position adjacent the front end of the jacket to the entry slot which is inwardly displaced from the front end, the film section being pushed further into the channel by means of its tail. This pusher movement continues until the tail is inserted fully within the channel to clear the entry slot. The film pusher then returns to its initial position in preparation for the next pushing action. After all film sections have been inserted and tails pushed in, jacket clamp 34 is raised to release jacket J and permit its removal from the inclined platform.

A more detailed disclosure of the structure and operation of this filler-reader machine is found in the above-identified Dorman patent.

Cam and Feedshaft Assembly

Referring now to FIGS. 6 to 11, there is illustrated a cylindrical cam and mode transfer feedshaft assembly which makes it possible selectively to operate the reader-filler machine in either of the following modes:

I. An automatic three-phase cycle insertion mode in the course of which a jacket J supported on platform 21 is indexed one step forward beyond the film trackway 25, the chip at the end of this cycle having its tail pushed in so that the trailing edge of the chip inserted in the channel is contiguous with the entry slot thereto.

II. An automatic four-phase cycle structuring mode whose first three phases are the same as those performed in the insertion mode, followed by a fourth and final phase in which platform 21 is reverse-indexed to bring the chip-loaded channel back into line with the trackway, whereby the trackway film may then be advanced into the entry slot to push the chip in the channel to a point where its leading edge is contiguous with the front end of the channel.

Figure 6:
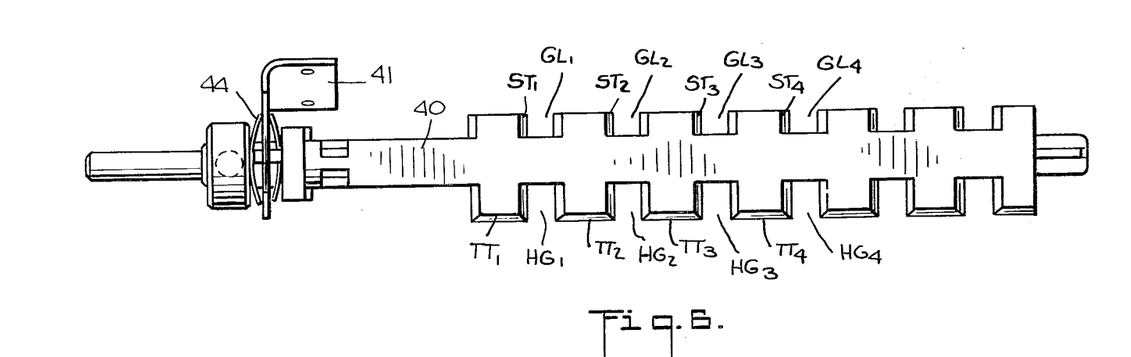
FIG. 6 is a longitudinal section taken through the feedshaft of the platform indexing assembly.
Figures 7, 10, 11:
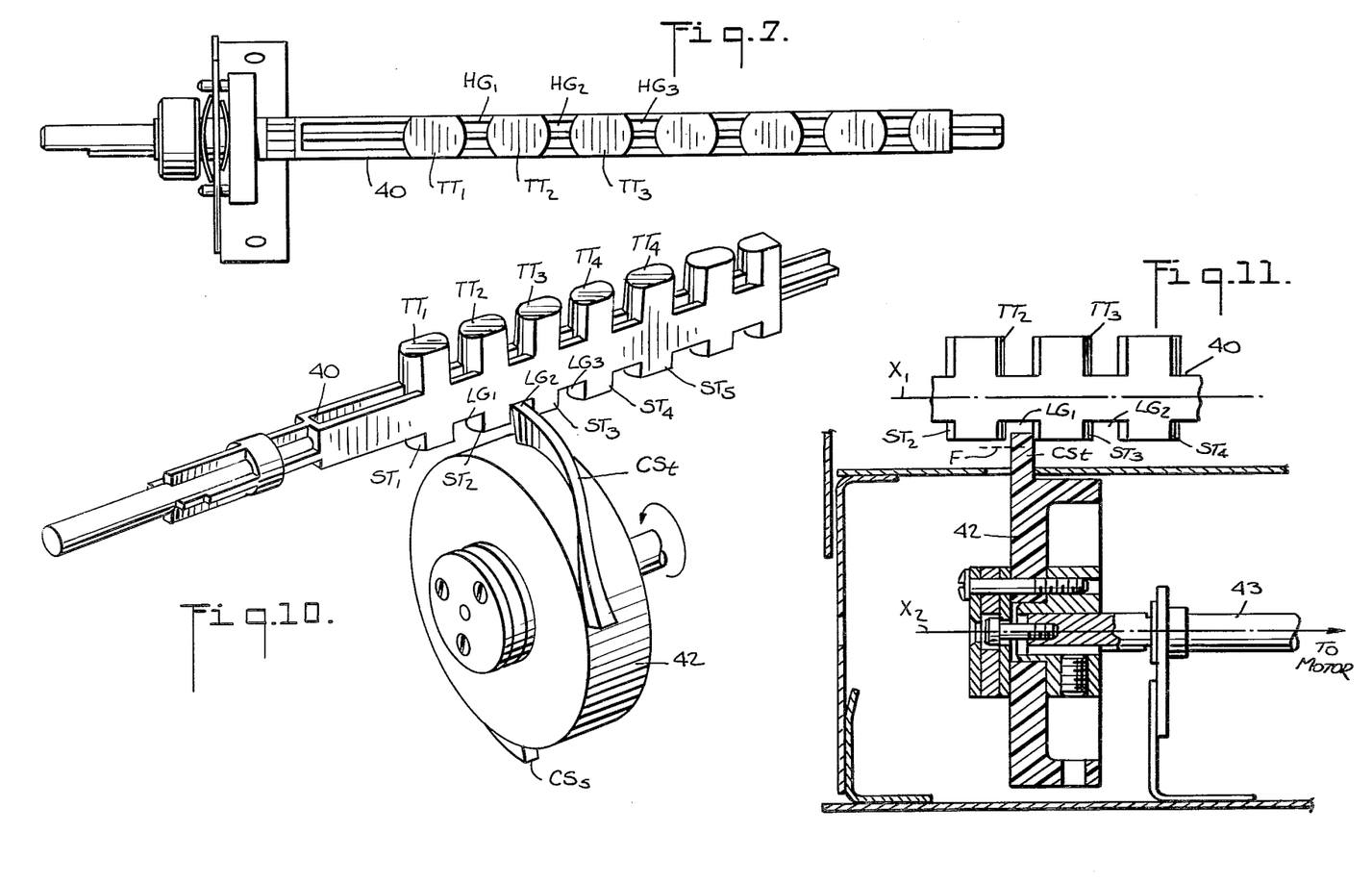
FIG. 7 is a plan view of the feedshaft.
FIG. 10 is a perspective view of the assembly.
FIG. 11 shows, in section, the cam in operative relation with the feedshaft.

The assembly includes a feedshaft 40 which is suspended below platform 21 with its axis parallel to the motion path by a bracket 41. Feedshaft 40 is constituted by a series of equi-spaced short teeth $ST_1$, $ST_2$, $ST_3$, etc., projecting from one side of shaft axis $X_1$. These short teeth define a row of low gaps $LG_1$, $LG_2$, $LG_3$, etc. Projecting from the opposite side of the same axis $X_1$ are correspondingly-positioned tall teeth $TT_1$, $TT_2$, $TT_3$ etc., to define a row of high gaps $HG_1$, $HG_2$, $HG_3$, etc.

Feedshaft 40 is manually reversible about its axis $X_1$ to render either the row of low gaps $LG_1$ etc.) or the row of high gaps ($HG_1$ etc.) operative with respect to a motor-driven cylindrical cam 42, which is rotatable on a spindle 43 whose axis $X_2$ is parallel to the axis $X_1$ of feedshaft 40, as shown in FIG. 11. To maintain feedshaft 40 in either of its selected positions, the shaft bearing therefor mounted on bracket 41 is provided with a detent 44. And to rotate the shaft, a knob 45 is provided, as shown in FIGS. 5A and 5B. Thus to render the machine operative in the desired mode, one simply turns knob 45 to the selected mode position.

Figure 8:
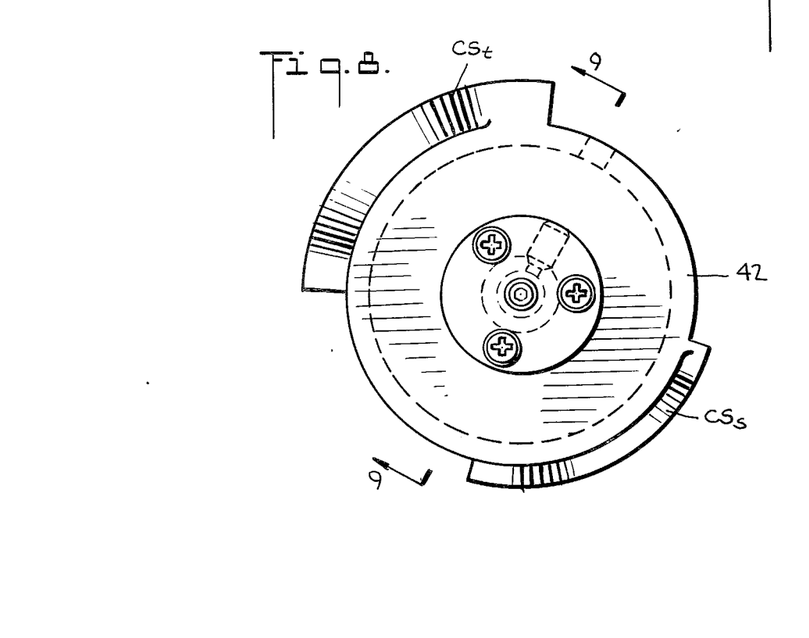
FIG. 8 is an end view of the cam of the assembly.
Figure 9:
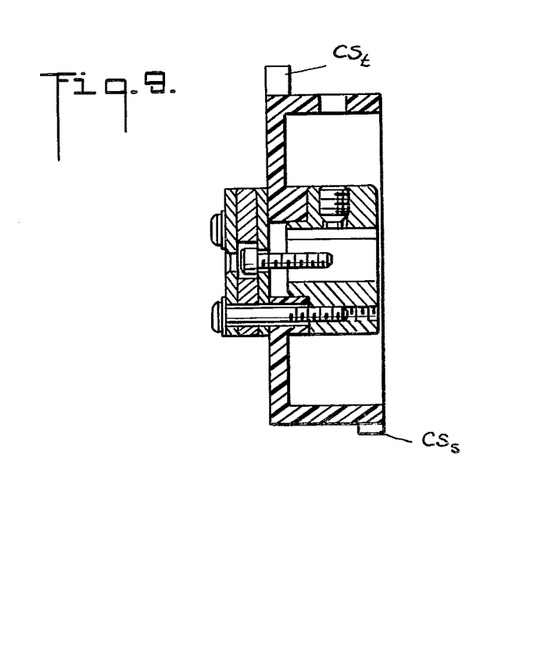
FIG. 9 is a section taken through the cam in the plane indicated by lines 9—9 in FIG. 8.

Cam 42 is provided at diametrically-opposed positions with two reversely-pitched helical segments $CS_s$ and $CS_t$ adapted to intermesh with the feedshaft teeth, one cam segment ($CS_s$) being short and the other cam segment ($CS_t$) being tall.

When the feedshaft is turned to render the row of low gaps $LG_1$, etc. operative with respect to the cam, as shown in FIG. 11, and the driven cam is caused to make a full revolution to cause segments $CS_t$ and $CS_s$ to pass in sequence by the feedshaft, only the tall cam $CS_t$ is received within the low gap in line therewith to intermesh with the short teeth which defines this gap. The short segment $CS_2$, whose face level is represented in FIG. 11 by dashed line L, falls short of the low gap and therefore does not intermesh with the short teeth.

As a consequence, when the low gaps are presented to the cam, feedshaft 40 and platform 21 associated therewith are indexed one step forward by a distance determined by the axial displacement between the leading and trailing edges of the tall helical segment $CS_t$. Thus FIG. 10 shows the leading edge of tall segment $CS_t$ entering low gap $LG_2$ on feedshaft 40. At the end of a full rotation of the cam, the feedshaft and the platform are indexed one step forward to bring the next low gap $LG_3$ in line with tall cam segment $CS_t$, so that the next full revolution of the cam, the platform will be indexed still another forward step.

When, however, the row of high gaps $HG_1$, $HG_2$ etc. is operative and the cam is caused to make a full revolution to cause the tall segment $CS_t$ and the short segment $CS_s$ to pass the feedshaft in sequence, first the tall segment will be received in the high gap in line therewith to index the platform one step forward, and then the short segment which is reversely-pitched will be received in the same high gap to reverse-index the platform one step back, so that at the end of the full revolution of the same, the platform is back where it started.

Operation of the insertion mode is effected by turning the mode transfer feedshaft 40 to present to the cam the row of low gaps $LG_1$, $LG_2$ etc. Then when switch 33 is pressed to initiate the automatic three-phase insertion cycle, in the first phase of this cycle, a film section which is inserted through the entry slot into the channel then in line with film trackway 25, is cut by actuation of blade 26 to leave a tail extending beyond the entry slot.

In phase two of this mode, cam 42 is driven to make a full revolution to index platform 21 one step forward, thereby aligning the tail of the inserted film section with pusher station 27, the next empty channel then being in registration with film trackway 25. In the third and concluding phase of the insertion mode, pusher element 27 is actuated to push the tail into the entry slot, so that the trailing edge of the chip is then contiguous with the slot. A jacket J loaded in the insertion mode takes the typical form shown in FIG. 4.

Operation in the structuring mode is effected by turning the mode transfer feedshaft to present to the cam the row of high gaps $HG_1$, etc., for then a four-phase cycle takes place. The first three phases are the same as those carried out in the insertion mode, so that at the end of the third phase, the tail of an inserted chip has been pushed into a loaded channel which is one step away from film trackway 25 which is then in line with the next empty channel.

In the fourth and final phase of the structuring mode, platform 21 is reverse-indexed to bring the loaded channel back in line with the film trackway. This permits the operator to advance film from the trackway into the loaded channel to push the chip therein to a point where its leading edge is contiguous with the front end of the channel. The film is then retracted in to the trackway. Thus when a jacket J is loaded with chips which are structured, the jacket typically has the appearance shown in FIG. 1.

At the end of each three-phase cycle in the insertion mode, the next empty channel is in line with film trackway 25 in readiness for the next insertion cycle. But at the end of each four-phase cycle in the structuring mode, the film trackway 25 is in line with a loaded channel, and it is necessary, therefore, to manually bring the next empty channel in the jacket in line with the film trackway in readiness for the next structured insertion. This is done by means of a detent release lever 46 which makes it possible to shift the platform to the appropriate position.

While there has been shown and described a preferred embodiment of a reader-filler machine for microfilm jackets operable in insertion or structuring mode in accordance with the invention, it will be appreciated that many changes and modifications may be made therein without, however, departing from the essential spirit thereof.

I claim:

1. In a reader-filler machine having a platform that is shiftable stepwise in a linear motion path normal to a stationary trackway for guiding a film web to sequentially bring the entry slot adjacent the rear end of each channel of a multi-channel microfiche jacket placed on the platform in registration with the trackway, a pusher station being disposed in parallel to the trackway and having a retractable pusher element in registration with the channel directly next to the trackway channel, said machine comprising:

A means to operate said machine in an insertion mode whereby after a section of film of a desired length is advanced by an operator from the trackway through said entry slot into the channel then in registration with the trackway, an automatic three-phase insertion cycle is initiated, said cycle being constituted by a first phase in which the section is cut from the film web to produce a film chip whose tail projects outside of said entry slot, a second phase in which the platform is indexed one step forward to bring the next empty channel in line with the trackway in preparation for the next insertion and the tail of the chip is then in line with the pusher element, and a third phase in which the pusher element is activated to engage the tail and push it into the channel to thereby complete the insertion operation, at which point the trailing edge of the chip is contiguous with the entry slot; and B means to operate said machine in a structuring mode when it is necessary to locate the chip in the channel with its leading edge contiguous with the front end of the channel whereby after a section of film of a desired length is advanced by an operator from the trackway through said entry slot into the channel then in registration with the trackway, an automatic four-phase structuring cycle is initiated whose first three phases correspond to the phases of the insertion mode followed by a fourth and final phase in which the platform is reversed-indexed one step to bring the loaded channel back into line with the trackway whereby the operator may then advance the film web into the channel to engage and push the chip therein until its leading edge is continguous with the front edge of the channel, indexing of the platform in the insertion of structuring mode being effected by a cam and mode transfer feedshaft assembly having a toothed feedshaft which is mounted under said platform and having a cylindrical cam, which is operatively coupled to the feedshaft, said cam being motor-driven so that each time the cam makes a full revolution in the insertion mode, the platform is indexed one forward step, and each time the cam makes a full revolution in the structuring mode, the platform is indexed one forward step and is then reverse-indexed one step back so that the platform is returned to its initial position for structuring.

2. A machine as set forth in claim 1, wherein said feedshaft is constituted by a series of equi-spaced short teeth projecting from one side of the shaft axis which extends in parallel relation to the indexing path of the platform to define a row of low gaps and a series of correspondingly-positioned tall teeth projecting from the opposite side of the shaft axis to define a row of high gaps, said shaft being manually reversible to present either the low gaps or the high gaps to said cam.

3. A machine as set forth in claim 2, wherein said cam is provided at diametrically-opposed positions with two reversely-pitched helical segments adapted to intermesh with the feedshaft teeth, one segment being short and the other tall, whereby when the row of low gaps is presented, and the cam makes a full revolution to cause the segments sequentially to pass by the feedshaft, only the tall segment is received within the low gap in line therewith to intermesh with the short teeth which define this gap to cause the platform to index one step forward by a distance determined by the axial displacement between the leading and trailing edges of the tall segment, and when the row of tall gaps is presented and the cam makes a full revolution, first the tall segment is received in the high gap to index the platform one step forward and then the short segment is received in the high gap to reverse-index the platorm one step back.

4. A machine as set forth in claim 3, wherein said feedshaft is mounted below the platform by a bracket and is provided at one end with a knob to permit reversal thereof.

* * * * *